(12) United States Patent
Muramatsu

(10) Patent No.: US 7,090,136 B2
(45) Date of Patent: Aug. 15, 2006

(54) PORTABLE TERMINAL DEVICE, PROGRAM FOR READING INFORMATION, AND RECORDING MEDIUM HAVING THE SAME RECORDED THEREON

(75) Inventor: Takeharu Muramatsu, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 10/622,587

(22) Filed: Jul. 21, 2003

(65) Prior Publication Data

US 2004/0016814 A1 Jan. 29, 2004

(30) Foreign Application Priority Data

Jul. 24, 2002 (JP) ............... 2002-214733

(51) Int. Cl.
*G02B 26/10* (2006.01)
(52) U.S. Cl. ............... 235/462.25; 235/462.09; 235/472.01
(58) Field of Classification Search ........... 235/462.01, 235/472.01, 454, 383, 462.25, 462.09; 382/183, 382/189; 340/426.2; 455/403
See application file for complete search history.

(56) References Cited

U.S. PATENT DOCUMENTS

| | | | | |
|---|---|---|---|---|
| 5,659,167 A * | 8/1997 | Wang et al. | ........... | 235/472.01 |
| 5,821,523 A * | 10/1998 | Bunte et al. | ........... | 235/472.01 |
| 5,923,735 A * | 7/1999 | Swartz et al. | ............. | 379/93.12 |
| 6,040,856 A * | 3/2000 | Sakaegi | .................... | 348/231.6 |
| 6,058,304 A * | 5/2000 | Callaghan et al. | ....... | 455/422.1 |
| 6,330,975 B1 * | 12/2001 | Bunte et al. | ........... | 235/472.01 |
| 6,561,428 B1 * | 5/2003 | Meier et al. | ........... | 235/462.25 |
| 6,807,294 B1 * | 10/2004 | Yamazaki | .................... | 382/135 |
| 2002/0176711 A1 * | 11/2002 | Shizukuishi | ................. | 396/320 |
| 2003/0198383 A1 * | 10/2003 | Yamaguchi et al. | ........ | 382/183 |

FOREIGN PATENT DOCUMENTS

| | | |
|---|---|---|
| DE | 199 34 507 A1 | 2/2001 |
| DE | 201 12 270 U1 | 11/2001 |
| DE | 100 30 403 A1 | 1/2002 |
| EP | 1 081 943 A1 | 3/2001 |
| EP | 1 143 694 A2 | 10/2001 |
| JP | 9-259215 A | 10/1997 |
| JP | 2001-197186 A | 7/2001 |
| JP | 2002-27047 A | 1/2002 |
| JP | 2002-111909 A | 4/2002 |
| JP | 2002-176509 A | 6/2002 |

* cited by examiner

*Primary Examiner*—Ahshik Kim
(74) *Attorney, Agent, or Firm*—Birch, Stewart, Kolasch & Birch, LLP

(57) ABSTRACT

A portable terminal device and a program for reading information, which can read a code correctly with simple operations, and a recording medium having the program recorded thereon. A portable telephone with a camera has a camera for inputting information of an image of interest, a small light, which emits light through the operation of ON/OFF button while reading a bar code, an LCD display part for displaying information, and a control part including a CPU for controlling the whole device. The control part switches photography modes depending on the existence of objects such as natural images or bar codes. The control part recognizes a bar code when the device switches to a mode for bar code photography. Then, the device notifies a user of the results of the recognition and then performs a predetermined process based on the content of the recognition.

14 Claims, 8 Drawing Sheets

Front face

Front face

Back face

Fig.5A
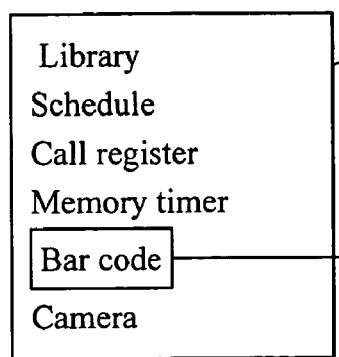
Fig.5B
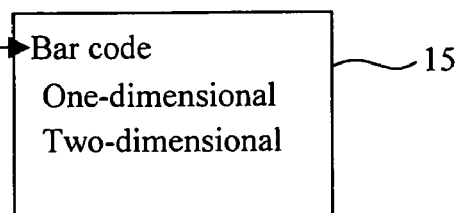
Fig.6
×1 displayed
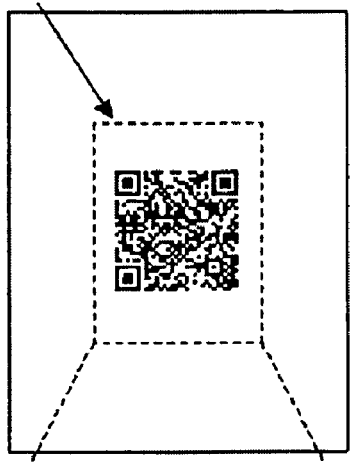
Area captured by camera
×2 displayed

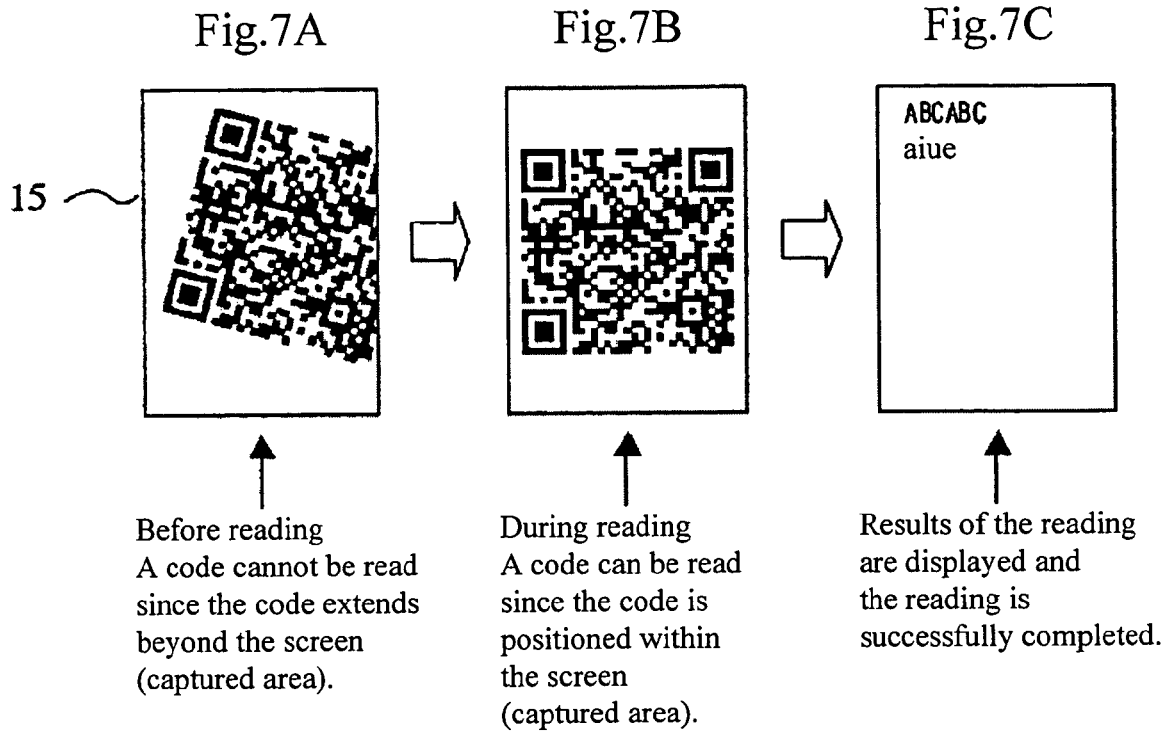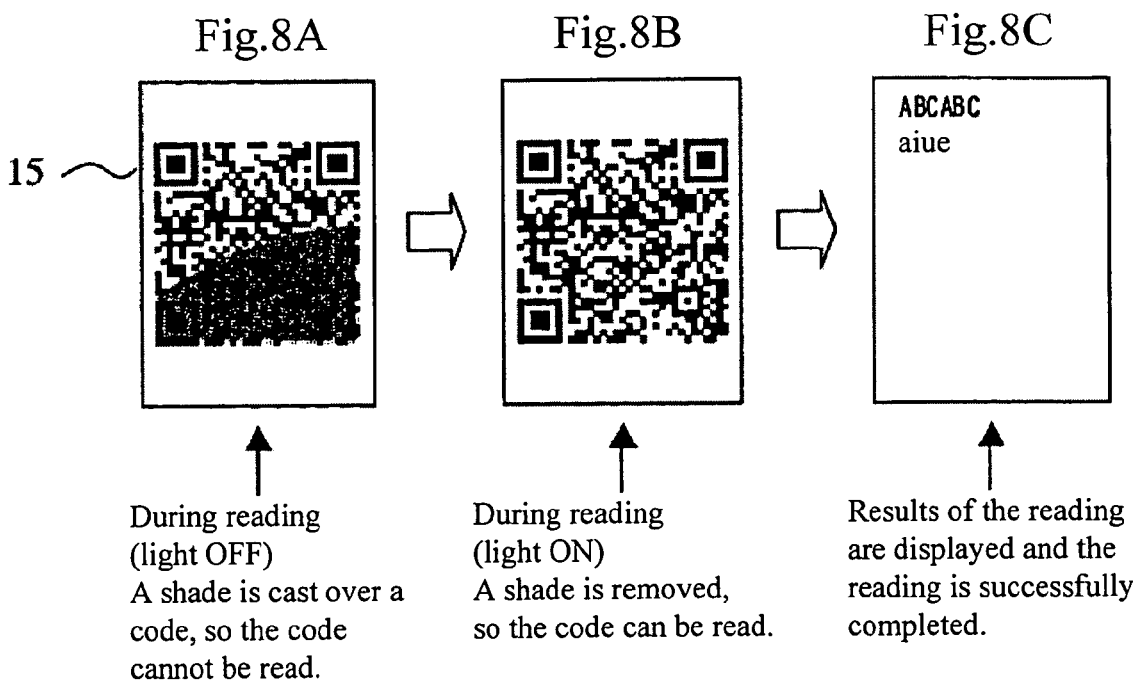

Fig.9A
Fig.9B
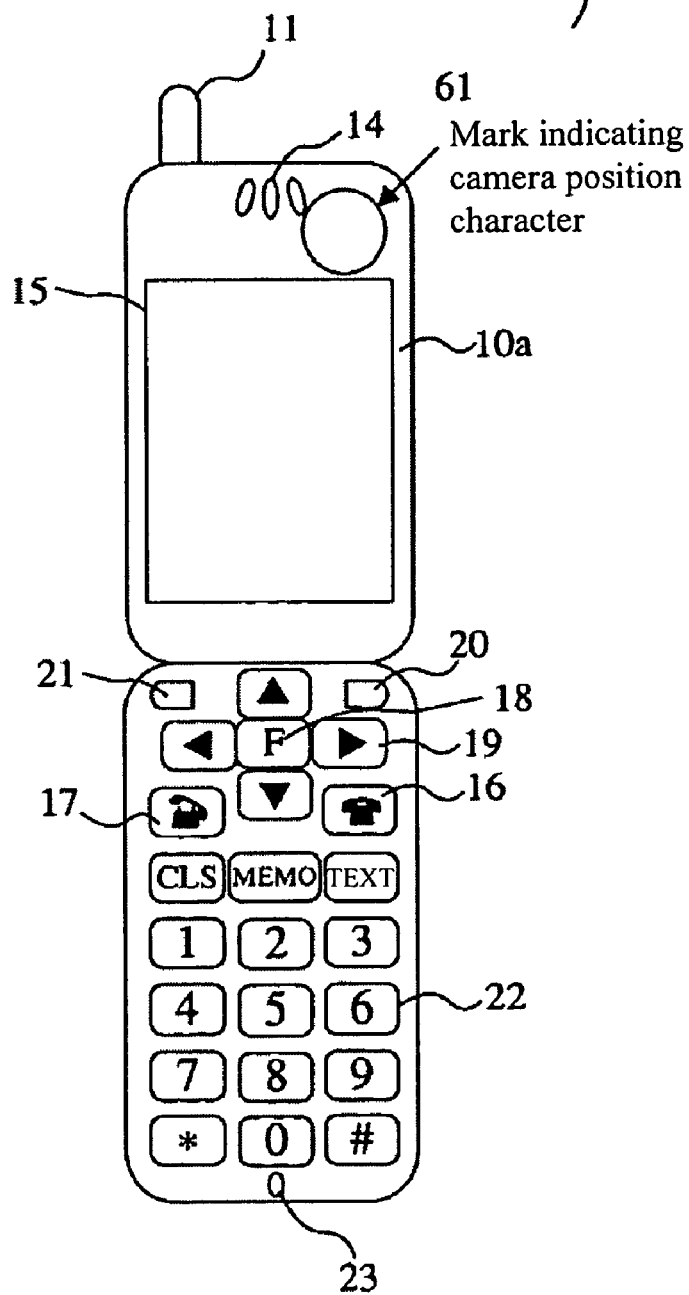
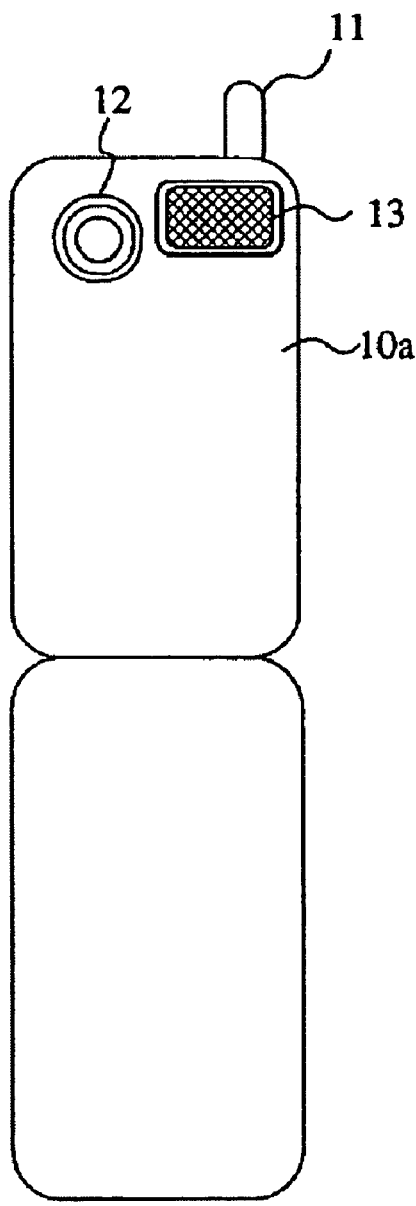
Front face
Back face

Front face

Back face

PORTABLE TERMINAL DEVICE, PROGRAM FOR READING INFORMATION, AND RECORDING MEDIUM HAVING THE SAME RECORDED THEREON

The present application claims priority under 35 U.S.C. §119 to Japanese Patent Application No. 2002-214733, filed Jul. 24, 2002, the entire disclosure of which is hereby incorporated by reference.

BACKGROUND OF THE INVENTION

1. Field of the Invention

The present invention relates to a portable terminal device such as a portable telephone with a digital camera or a camera, a program for reading information, and a recording medium having the program recorded thereon.

2. Background Art

Current portable telephones, which are provided with display devices such as a liquid crystal panel and input devices through key inputting, etc., tend to have multiple functions such as e-mail exchange and game-playing, in addition to telephone functions for transmitting and receiving radio waves.

In recent years, small image sensors with low power consumption have been developed, and this has allowed a camera to be built in a portable terminal device such as a portable telephone. Thus, it is possible to send images by e-mail immediately after they are taken by a built-in camera. As for these cameras, priority is given to the fact that they are small, and their resolution is lower than that of generally available digital cameras.

Further, in recent years, portable telephones can be connected to the Internet. For the connection to the Internet, it is necessary to input a URL (Uniform Resource Locator) through the keys and it is troublesome to input a long URL through the keys of a portable telephone. To solve this problem, a unique number is assigned to a URL, a bar code corresponding to the number is printed, and the printed bar code is read by a bar code reader, which avoids excessive user labor for inputting the URL. This attempt has been made to improve the usability for users. In the case of such a device, an independent bar code reader is required to be connected to a portable telephone.

However, in the case of a portable terminal device having a camera built therein, when a bar code is recognized from a bar code image inputted by the built-in camera, the above service is available without the preparation of an independent bar code reader.

JP Patent Publication (Kokai) No. 2002-111909 A, for example, discloses an information-providing service whereby a user can select and set among a photograph mode and a QR code (two-dimensional code) reading mode, and where processing is conducted in accordance with the setting mode. Further, JP Patent Publication (Kokai) No. 9-259215 A (1997) discloses a code reader, which processes a one-dimensional code by a line CCD and a two-dimensional code by an area CCD for enhancing reading accuracy. However, the setting of a camera image capture area in accordance with types of bar codes is not disclosed.

Furthermore, JP Patent Publication (Kokai) No. 2001-197186 A discloses that a telephone number is replaced with a two-dimensional bar code and the two-dimensional bar code is read by a CCD scanner installed on a telephone.

In the meantime, the resolution of currently built-in cameras is lower than that of an image sensor used for a bar code reader and therefore it has been difficult to recognize a bar code with high accuracy.

Further, the cause for the above difficulty in recognizing bar codes is that the widths of bars photographed on an input image are not constant. This is because the distance between a bar code and a camera varies whenever an image is inputted. In the case of a close-up type scanner, a bar code can be always inputted in a constant size, and therefore the widths of bars can be predetermined. However, when a bar code is photographed by a hand held camera, it is impossible to predetermine constant bar widths.

A method for recognizing a bar code by determining bar widths based on a bar code image inputted by an image scanner has been proposed. For example, JP Patent Publication (Kokai) No. 2002-176509 A discloses a device that recognizes a bar code included in an image captured by a camera, and generates speaker sound when the captured image is decodable. At the same time, it saves the bar code data and displays it as an image on a display part.

However, conventional portable terminals with cameras have the following problems.

For example, since a one-dimensional code or a two-dimensional code differs in physical size from a code to be read, suitable resolution has to be selected depending on the size of codes in the case of a portable telephone camera, which has a comparatively low resolution.

Also, a camera usually set for photographing persons or landscapes is not anticipated for use in macro-mode photographing of a bar code, and thus a bar code image suitable for reading cannot be taken.

Furthermore, since a camera of a portable terminal device has a comparatively narrow angle of view, it is difficult to set a code to be read in a range photographed by the camera. In this case, close-up photographing is necessary, and this causes a shadow of the main body of the device itself or the like, which is likely to affect a captured image, so that a stable image cannot be obtained.

SUMMARY OF THE INVENTION

The present invention has been achieved in view of the above problems, and an object of the present invention is to provide a portable terminal device that can accurately read a code with easy operation, a program for reading information, and a recording medium having the program recorded thereon.

Another object of the present invention is to provide a portable terminal device capable of easily setting a camera opening to correspond with an object.

A further object of the present invention is to provide a portable terminal having image pick-up means for picking up an image and photography procedure switching means for switching to a bar code photography mode as an object to be photographed. There is display means for displaying the image obtained by the image pick-up means, and code recognition means for recognizing the picked-up bar code image when the device is switched to the bar code photography mode by the photography procedure switching means.

It is more preferable that the photography procedure switching means changes an image capture area in the image pick-up means, depending on the type of bar code.

It is more preferable that the photography procedure switching means changes at least one or more of the factors of gradation property, contrast, brightness, white balance, exposure, focus depth, edge enhancement, and resolution between a natural image and a bar code image.

It is preferable that the photography procedure switching means has frame rate control means, which, when switching to bar code photography mode, displays an image obtained by the image pick-up means at a high frame rate on the display means until the code recognition means starts up and displays an image at a frame rate necessary for the code recognition means after the code recognition means starts up.

Further, the portable terminal device of the present invention preferably has lighting means for lighting the object, and furthermore, it may have lighting switching means for turning on/off the lighting means.

In addition, the portable terminal device preferably has notifying means for giving notice of a result recognized by the code recognition means.

The notifying means gives notice of the recognized result via sound, voice, or a message displayed on the display means.

The portable terminal device also has timer setting means for measuring a setting time, wherein the notifying means gives notice of recognition failure when a bar code is not recognized within a period set by the time setting means.

A portable terminal device of the present invention comprises a camera for picking up an image and a display part for displaying the picked-up image, both being built therein, wherein a marker indicating camera position is provided.

The marker is provided on the surface of a main body just at the back of an opening of the camera by a printing, an inscription, or a sticker.

Further, when the display part is located on the main body just at the back of the opening of the camera, the portable terminal device may have marker display means for displaying image information indicating the marker on the display part.

The marker display means preferably deletes the display of the image information indicating the marker in synchronization with the shutter operation of the camera or at the same time of a notice of image pick-up result, or switches on/off the display of the image information indicating the marker in accordance with user's instruction.

Further, according to a more preferable embodiment, the image pick-up means picks up a moving/still image with an area-type solid-state image sensing device.

According to a more preferable embodiment, the portable terminal device is a portable telephone or portable information terminal.

Further, the present invention provides a computer-readable recording medium having a program recorded thereon, the program causing a computer to operate a portable terminal device comprising:

image pick-up means for picking up an image;

photography procedure switching means for switching to a bar code as an object to be photographed;

display means for displaying the image obtained by the image pick-up means; and

Further, the present invention provides a computer-readable recording medium having a program recorded thereon, the program causing a computer to operate a portable terminal device including image pick-up means for picking up an image, and photography procedure switching means for switching to a bar code photography mode as an object to be photographed. There is display means for displaying the image obtained by the image pick-up means, and code recognition means for recognizing the picked-up image of the bar code when the device is switched to the bar code photography mode by the photography procedure switching means.

Furthermore, the present invention provides a program causing a computer to operate a portable terminal device including image pick-up means for picking up an image, and photography procedure switching means for switching to a bar code photography mode as an object to be photographed. There is display means for displaying the image obtained by the image pick-up means, and code recognition means that recognizes the picked-up image of the bar code when the device is switched to the bar code photography mode by the photography procedure switching means.

BRIEF DESCRIPTION OF THE DRAWINGS

FIG. 5 is a view showing an example of mode selection screen display on an LCD display part of the portable terminal device according to this embodiment.

FIG. 6 is a view showing that image capture areas and magnifications at the time of displaying according to the portable terminal device of this embodiment has different are varied, depending on the one-dimensional or two-dimensional code.

FIG. 7 is a view showing screen display examples obtained by the bar code reading process of the portable terminal device of this embodiment.

FIG. 8 is a view showing screen display examples obtained by the bar code reading process of the portable terminal device of this embodiment.

FIG. 9 is a view showing the outer appearance of a portable terminal device according to another embodiment.

DETAILED DESCRIPTION OF THE INVENTION

Figure 1A:
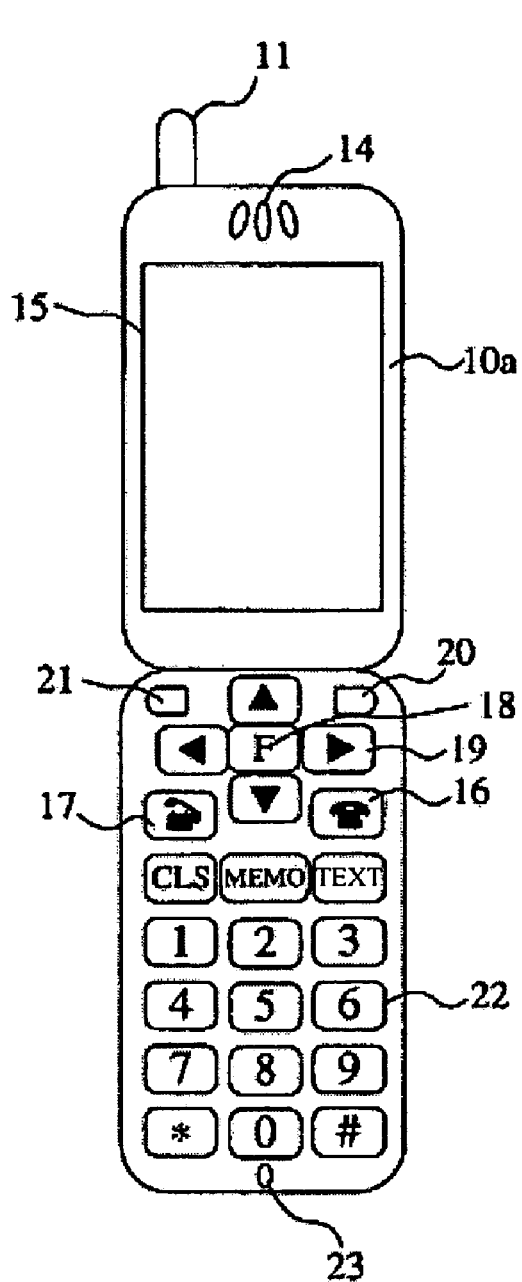
FIG. 1 is a view showing the outer appearance of a portable terminal device according to an embodiment of the present invention.

Hereinafter, preferred embodiments of portable terminal devices according to the present invention will be described in detail by referring to the accompanying figures.

First, the basic concept of the present invention is described. A case wherein a portable terminal device of the present invention is applied to a portable telephone with a camera is taken as an example.

(1) The portable telephone with a camera has a small light built therein, which can be turned on or off through the user's operation. When the camera reads a two-dimensional bar code, for example, the light is turned on or off through the user's operation. Even when the peripheral light quantity is reduced due to lens properties or a shadow of the main body of the telephone overlaps the code to be read, the code can be stably read by the user turning on or off the light. In an embodiment wherein the light is turned on whenever reading codes, adverse effects may be caused by specular reflection. Thus, the light is switched on or off while checking the image being inputted with the camera on an LCD display part.

(2) The portable telephone with a camera allows an image of code being picked up to be displayed on an LCD display part in real time when reading the code. A user can confirm that the bar code has been correctly photographed by a camera through the display of the image of the code being picked up in real time. This prevents the code from protruding beyond the screen, as well as the generation of a largely deformed image thereof, thereby improving the operability. Further, after the reading, the results of the reading are immediately displayed on the screen, whereby they can be instantly known. Furthermore, when the reading is completed, a reading completion sound such as a "ping" or "tinkle" may be used to inform a user of the completion of the reading.

(3) Reading operations are performed continuously on each image captured successively, and continued until the reading is completed. At this time, it takes a long time for reading process, so the frame rate of capturing images is at most approximately 2FPS (frame per second) and that of displaying is also approximately 2FPS. This condition makes it difficult to set a code to a suitable position while watching the LCD display part. Therefore, the portable telephone with a camera according to the present invention does not perform the reading process on a code until a user provides instructions, so that smooth moving images are displayed on the LCD display part. This allows the user to suitably position a code. After the code is placed in a suitable position, a button is operated to permit the device to perform the reading process. At this time the frame rate of displaying decreases to about 2 FPS, but the code has already been photographed at the suitable position, and thus the reading can soon be finished without a problem.

(4) Moreover, in the case of an ordinary portable telephone with a camera, color shade or the like is absolutely adjusted to be natural for the purpose of photographing persons and landscapes. Due to this, it is not suitable for use in reading codes. The portable telephone with a camera according to the present invention has a mode that is prepared and adjusted for code reading, which is different from ordinary modes. When reading codes, this mode is used. For example, in order to emphasize the bright and dark contrast of a code, white balance or exposure is adjusted, correction factors are adjusted for emphasizing borders (edge portion), or a special mode for bar code reading having adjusted resolution is prepared. When a user designates code reading, the telephone is automatically switched to the above bar code reading mode.

(5) The code to be read is classified into types such as one-dimensional code or two-dimensional code. Depending on the types of these codes, the size or line thickness of printed code is different. Thus, the present portable telephone with a camera allows a user to designate which code is to be read (one-dimensional code or two-dimensional code), and in response to user's designation, the image capture area of the camera is changed. Also, the magnification is optimized at the time of displaying.

Figure 1B:
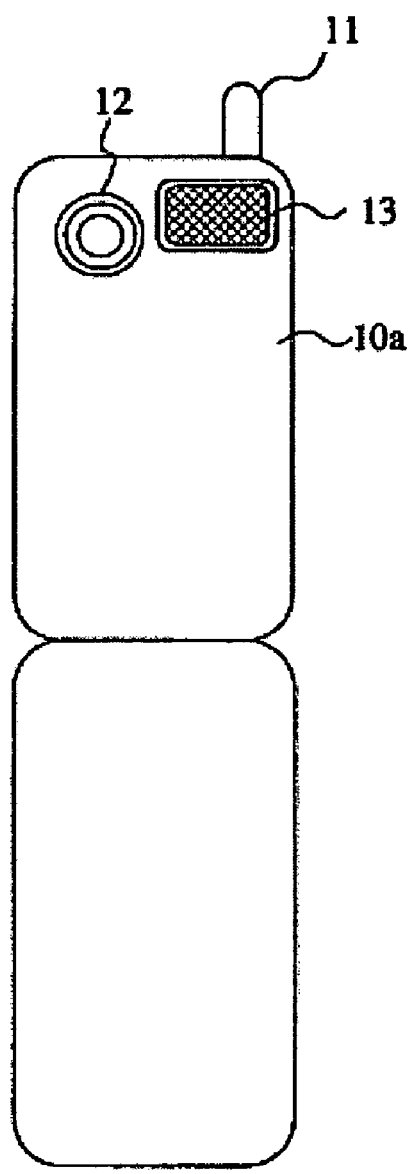

FIG. 1 is a view showing the outer appearance of a portable terminal device according to this embodiment of the present invention based on its basic concept. FIG. 1(A) is a front view thereof, and FIG. 1(B) is a rear view of thereof.

The portable terminal device of this embodiment is an example wherein a code reader is applied to a portable communication terminal such as portable telephone or PHS (Personal Handy-Phone System) with a camera.

FIG. 1 shows a portable telephone 10 with a camera (portable terminal device). A portable telephone main body 10a comprises an antenna 11 for conducting wireless communications, a camera 12 (image pick-up means) for inputting image information of interest, the camera being built-in the rear face of the main body 10a, a small light 13 (lighting means), built-in the rear face of the main body 10a, which is lit through user's operations, etc. when reading bar codes or being used in a dark place, a speaker 14 (a part of notifying means) for receiving voices and amplifying them, an LCD display part 15 (a part of the display means and notifying means) for displaying information such as guidance for operations, received information, images, or text information, a power key 16 for turning the telephone on or off, a telephone function key 17 for conducting, for example, the reception, transmission, switching over telephone functions, determination of operations, a mode key 18 for switching over various functions, cursor keys 19 for moving a cursor from right to left or up and down to select an object of interest, a shutter key 20 that works as a shutter button to determine the input of the camera 12, a light ON/OFF button 21 for turning the light 13 (lightning switching means) on or off, dial keys 22 including membrane keys for dialing such as inputting telephone numbers, and a microphone 23 for inputting voices.

The camera 12 is a CCD (Charge Coupled Device: an area-type solid-state image sensing device) camera, which is built into the portable telephone 10 and has, for example, 340,000 pixels. The camera 12 has a unifocal lens and can change the depth of focus between the time of ordinary photography and the time of reading bar codes. Detailed configuration will be described by referring to FIG. 3.

The LCD display part 15 comprises an LCD display having a dot matrix structure, a PDP as a backlight, an EL, and each driver. Image information to be inputted through the camera 12 is displayed on the LCD display 15 while photographing. When code recognition is completed, the results of the recognition will be displayed on the LCD display with messages such as characters or icons. Further, while not photographing, numbers inputted through the dial key 22, various screens for non-telephone functions, icons indicating operation states of telephone functions, etc. may be displayed. Furthermore, the time is displayed during the standby period, and, in addition, personal information, the state of system or the like is displayed.

Figure 2:
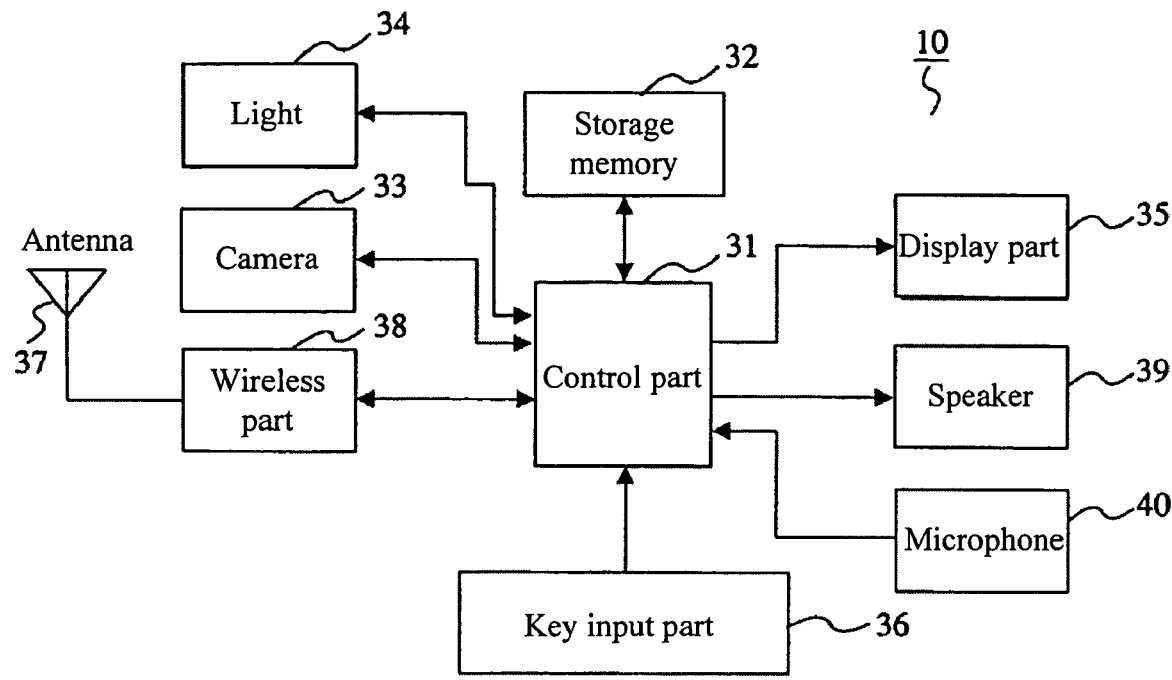
FIG. 2 is a block diagram showing a case wherein a bar code reader of the portable terminal device of this embodiment is incorporated into a potable telephone with a camera.

The power key 16, telephone function key 17, mode key 18, cursor keys 19, shutter key 20, light on/off button 21 and dial key 22 are all manually operated, and the contents of the operations as information are transmitted to the control part 31 (FIG. 2). According to this embodiment, the shutter key 20 or light on/off button 21 is independent, but the functions of these keys may be assigned to other keys (for example, mode key 18).

FIG. 2 is a block diagram showing a case wherein a bar code reader is incorporated into a portable telephone with a camera.

In FIG. 2, the portable telephone 10 is a portable information terminal such as a PDA (Personal Digital Assistant), or a PHS or portable telephone. The portable telephone 10 is configured to have a control part 31 including a CPU for controlling the entire device (photography procedure switching means, code recognition means, information processing means, frame rate control means, and timer setting means); a storage memory 32, which comprises a semiconductor memory such as a ROM for storing a control program, fixed data or the like, a RAM as a storage region for CPU operations, and a hard disk, and which stores text information, image information, and voice signals, those being received or inputted; a camera 33 (image pick-up means) for inputting image information of interest; a light 34 (lighting means) for emitting light through use's operation while reading bar codes; a display part 35 (a part of the display means and notifying means) for displaying text information or image information to a user; a key input part 36 for inputting and generating key operation information from a user; an antenna 37 for transmitting and receiving radio waves, a wireless part 38 for controlling the transmission and reception of wireless communications; and a speaker 39 (a part of the notifying means) for outputting voice signals, and a microphone 40 for inputting voice signals from a user.

The control part 31 controls the whole portable telephone 10 and at the same time has a bar code reader. Therefore, based on key operations, the control part 31 controls the steps of photographing bar codes with the camera 33, displaying image information, and recognizing bar codes, and then performs the process based on the content of the recognition.

Particularly, the control part 31 functions as photography procedure switching means for switching photography procedures depending the existence on an object such as a natural image or a bar code, code recognition means for recognizing (decoding) bar codes when the device is switched to the bar code photography mode, notifying means for giving notice of the results of the recognition to a user, and information processing means for conducting a predetermined processing based on the content of the recognition.

Further, when the device is switched to bar code photography mode, images obtained by the camera 33 are displayed on the display part 35 at a high frame rate until the code recognition means starts up. After the start-up of the code recognition means, images are displayed at a frame rate required for the code recognition means. In this way, the control part 31 also has a function as frame rate control means. The detailed description of the above individual functions will be made using the flow chart of FIG. 4.

The ROM is a read-only semiconductor memory that stores fixed data such as communications control data and programs necessary for the operations of the control part 31. The RAM is used as a working memory, which temporarily stores data concerning bar code recognition or communications, data used for calculation, the results of the calculation, etc. The program processed by the portable telephone 10 is developed and executed in this RAM. Also, a part of RAM comprises an EEPROM (electrically erasable programmable ROM), which is a non-volatile memory and electrically rewritable. Specifically, various specifications in the portable telephone 10 can be modified by changing a program so that the program can be recorded on the EEPROM. In other words, non-volatile memories such as EPROM and EEPROM have recently been used for a program ROM in order to avoid time loss from changing a mask ROM whenever debugging for system development, thereby resulting in large reduction of the period for program development and modification. Further, if the program is downloaded for rewriting the program content of EEPROM, it is possible to easily upgrade or modify the functions.

Figure 3:
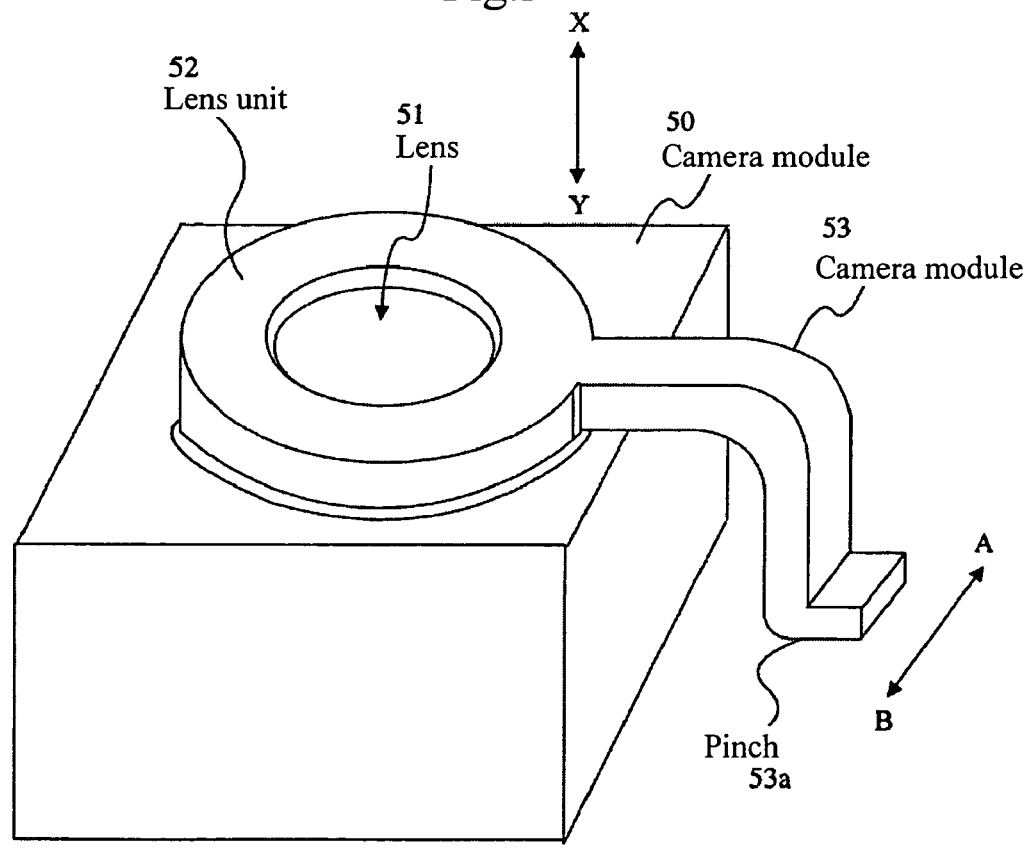
FIG. 3 is a schematic view showing a mechanism for switching the depth of camera lens focus of the portable terminal device according to this embodiment.

FIG. 3 is a schematic view showing a mechanism for switching the depth of lens focus of the camera 12, and shows a depth-of-focus switching mechanism at the time of ordinary photographing and at the time of reading bar codes.

In FIG. 3, the mechanism is configured to have a camera module 50 including a solid-state image sensing device such as CCD and a signal output circuit thereof, a lens unit 52 having a lens 51 therein and being mated by screws with the top of the camera module 50, and a camera lever 53 mounted on the outer region of the lens unit 52 and for rotating the lens unit 52.

The lens unit 52 is mated by screws with the camera module 50. When a pinch 53a of the camera lever 53 is moved in the direction of A←→B as shown in FIG. 3, the lens unit 52 moves in the direction of X←→Y relative to the camera module 50. This can change the focal length between the lens 51 mounted on the lens unit 52 and the camera module 50, and thereby the depth of focus is switched between ordinary photography and bar code reading. This embodiment has a configuration so that, when reading bar codes, a driving part (not shown) comprising a solenoid, etc., which receives drive signals from the control part 31, allows the camera lever 53 to slide so as to automatically change the depth of focus. However, the main body 11a of camera may be provided with a sliding pinch synchronized with the pinch 53a of the camera lever 53, and a user can manually change the depth of focus at a time of macro photography for bar code reading, etc.

Hereinafter, the operations of the portable telephone with a camera having the above configuration will be described.

Figure 4:
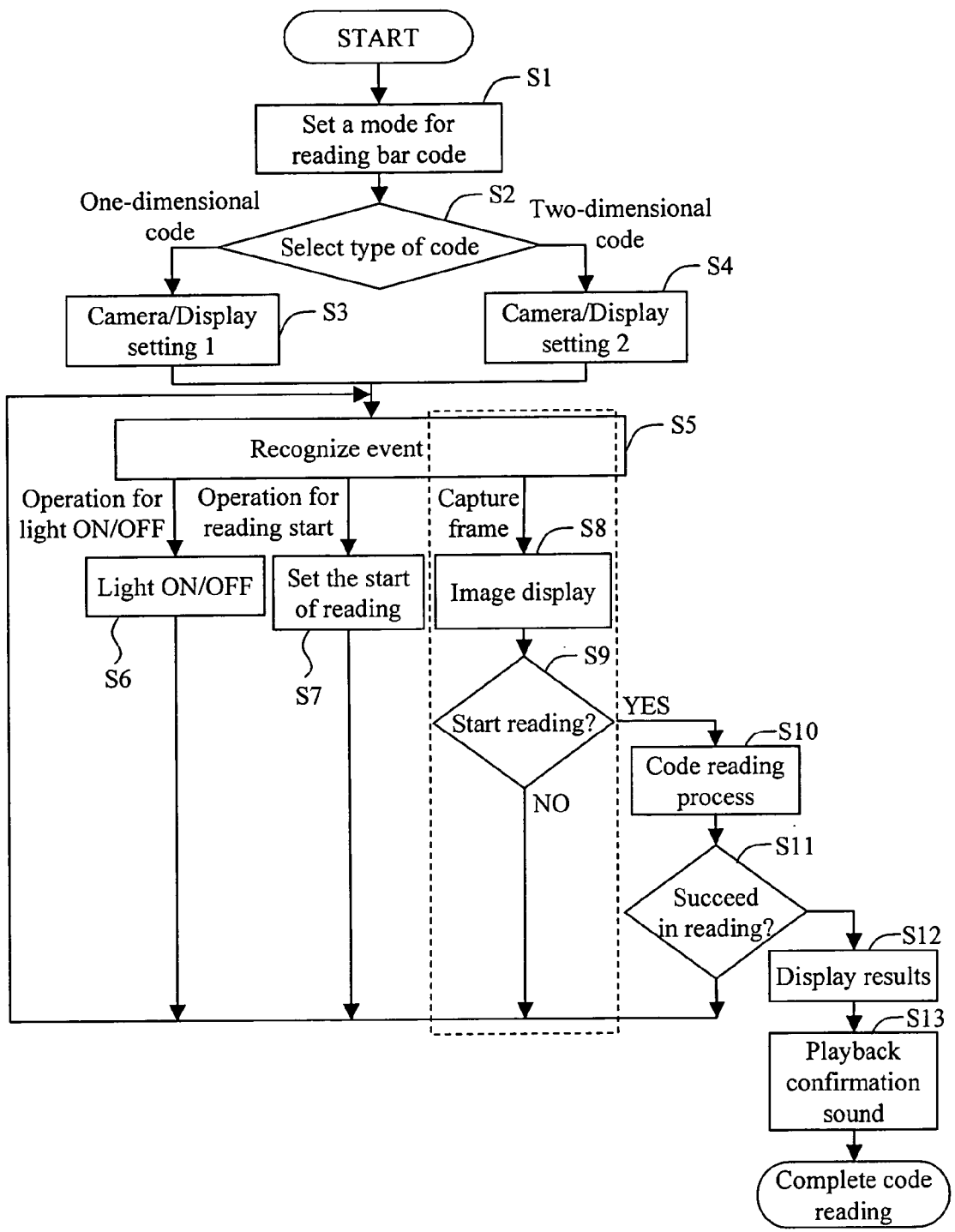
FIG. 4 is a flow chart showing bar code reading operations of the portable terminal device according to this embodiment.

FIG. 4 is a flow chart showing the operations for reading a bar code by the portable telephone 10 and the operations are conducted by the control part 31. In the figure, "S" represents each step.

FIG. 5 is a view showing an example of mode selection screen display on the LCD display part 15 of the portable telephone 10.

When a user presses a mode key 18 during stand-by state, a mode selection screen is displayed as shown in FIG. 5(A). In this state, "bar code" is selected with a cursor key 19 and the mode key 18 or a telephone function key 17 is pressed for the determination of mode. Then, the telephone is shifted to a bar code reading mode, and a code type selection screen is displayed as shown in FIG. 5(B).

The flow of FIG. 4 starts through "bar code" selection operation of the user. First, a bar code reading mode setting is conducted in step S1. In this bar code reading mode setting, initial settings necessary for reading a bar code are established. In this initial setting, processes except bar code reading process, such as camera-photographing and schedule management, are properly finished and the data therefor is saved. The program necessary for reading a bar code is then started, and the switching mechanism for the depth of focus necessary for reading a bar code is operated as shown in FIG. 3.

In step S2, the type of code is determined upon the receipt of user's instructions in response to the code type selection screen as shown in FIG. 5(B). When one-dimensional code is selected as the type of code, the routine advances to S3. When two-dimensional code is selected, the routine advances to S4.

When the bar code reading mode is set, the type of code (one-dimensional code/two-dimensional code) is selected by the user. As described above, there are several types of codes to be read, such as one-dimensional codes and two-dimensional code. The sizes or the line widths of printed codes vary depending on the type of code. Therefore, the user designates whether a one-dimensional or a two-dimensional code is to be read, and in accordance with user's designation, the image capture area of the camera and magnification ratio while displaying are optimized.

In the case of a one-dimensional code, a predetermined value (setting value 1) is set for the camera and display in step S3.

In the case of a two-dimensional code, a value different from the above setting value 1 (setting value 2) is set in step S4.

FIG. 6 is a view illustrating that image capture areas and magnifications at the time of displaying are varied depending on the user of one-dimensional or two-dimensional code.

As shown in FIG. 6, in the case of one-dimensional code, the area captured by the camera is set to be 640 (height)×480 (length), and the image display is set to be equal to the image captured by the camera. In contrast, in the case of two-dimensional code, the area captured by the camera is set to be 320 (height)×240 (length), and the image display is set to be twice as large in height and length as the image captured by the camera. Namely, in the case of one-dimensional code, the captured area is set to fit a bar code having a large amount of information in a one-dimensional direction into an area photographed horizontally by the camera. In the case of two-dimensional code, the area photographed by camera (camera-captured-area) is reduced by half vertically and horizontally, and then this camera-captured image is magnified twice vertically and horizontally to be displayed. In addition to this, other settings such as enhancement of edge components and contrast enhancement may be commonly used as camera settings for both one- and two-dimensional codes.

Referring back to the flow chart of FIG. 4, when camera/display setting 1 (S3) or camera/display setting 2 (S4) is performed, the device is in a standby condition for event (S5). Depending on individual events, processes are changed over.

The event for light ON/OFF operation occurs when a user presses the light ON/OFF button 21. When this event is recognized in Step 5, the routine advances to Step 6 to turn on or off the light 13 according to the setting.

The event for reading start operation occurs when a user presses the reading start button (e.g., telephone function key 17). When this event is recognized in Step 5, the routine advances to Step 7 to set a flag indicating reading start. Further, as described below in FIG. 10, when the device has a configuration such that a mark indicating the position of the camera 12 is displayed on the LCD display part 15, the mark may not be displayed after starting the reading.

The event for frame capture occurs when the camera 12 reads an image for one frame and then finishes the reading. When this event is recognized in Step 5, the routine advances to Step 8 to display the captured image on the LCD display part 15 in accordance with the setting. At this time, the mark 71 (see FIG. 10) indicating the position of the camera 12 may be displayed simultaneously on the LCD display part 15.

In Step 9, it is judged whether or not to start the reading process. When the reading start flag is set up (YES in Step 9), the code reading process starts in Step 10. When the reading is aborted, the routine returns to Step 5 for recognizing an event.

In Step 11, it is judged whether or not the code reading is successfully achieved. When the code reading is successfully completed (YES in Step 11), the captured result is displayed on the LCD display part 15 in Step 12. Then, in Step 13, a confirmation sound is played back with a speaker 14, and the code reading according to this flow chart is completed. By playing back the confirmation sound to inform a user of the completion of the reading, the user's attention is drawn to the completion, and the user knows the bar code reading is completed.

Before the reading starts, the loop enclosed by the broken line in FIG. 4 is repeated. During this period, the code reading process is not conducted, and thus smooth display at a high frame rate is available.

FIG. 7 is a view showing screen display examples obtained by the above bar code reading process. FIG. 7(A) shows a photography screen before the reading process. FIG. 7(B) shows a photography screen during the reading process. FIG. 7(C) shows a screen of the recognized result after the reading process.

Although the description will be made using an example wherein a pattern to be recognized is a two-dimensional code, images to be recognized may be character patterns in addition to symbol patterns such as one-dimensional/two-dimensional bar codes.

Before the reading starts, smooth display at a high frame rate is available. Therefore, for example, as shown in FIG. 7(A), a user can easily handle the camera 12 (main body 10a of portable telephone) so that a code is positioned within the screen while watching to make sure that the code does not extend beyond the screen (captured area). In other words, since the delay in displaying images of the code on the screen before the reading is very short, a user can operate the device so as to locate the code within the screen while watching the screen naturally. Then, as shown in FIG. 7(B), when the code is located within the screen, the user operates the device to conduct the reading and thereafter the result of the reading is displayed (see FIG. 7(C)).

FIG. 8 is a view showing screen display examples obtained by the above bar code reading process. FIG. 8(A) shows a photography screen before the reading process. FIG. 8(B) shows a photography screen during the reading process. FIG. 8(C) shows a screen of the recognized result after the reading process.

Further, as shown in FIG. 8(A), when a part of the image is dark due to shade or the like, the code reading becomes difficult. The code reading is conducted by bringing the camera 12 (main body 10a of portable telephone) close to a code to be read for photography, and this is likely to cause shade.

In this embodiment, a user can confirm the state of currently inputted image by watching the screen. Thus, when the code is shaded as shown in FIG. 8(A), the light ON/OFF button 21 is pressed to turn on the light 13. Then, the influence of the shade is removed as shown in FIG. 8(B), and the reading is successfully achieved (see FIG. 8(C)).

FIG. 9 is a view showing the outer appearance of a portable terminal device according to another embodiment. FIG. 9(A) is a front view thereof, and FIG. 9(B) is a rear view thereof. In FIGS. 1 and 9, like parts are designated by like reference numbers.

In FIG. 9, a portable telephone 60 with a camera (portable terminal device) has a mark 61 indicating the camera position on the back surface of the main body 10a and just at the back of the camera 12 (opposite position of the opening of the camera 12) with a sticker, a printing or the like.

Since a user cannot see the camera position while visually observing an LCD display part 15, it is rather difficult to move the camera 12 to an object. Particularly, when the camera should be brought close to a bar code for bar code reading, the above problem is remarkable.

In this embodiment, a mark 61 is attached just at the back of the opening of the camera 12, and therefore this mark 61 becomes a kind of target for moving the camera 12 to a code to be read as an object, so that the user can operate it easily.

Figure 10A:
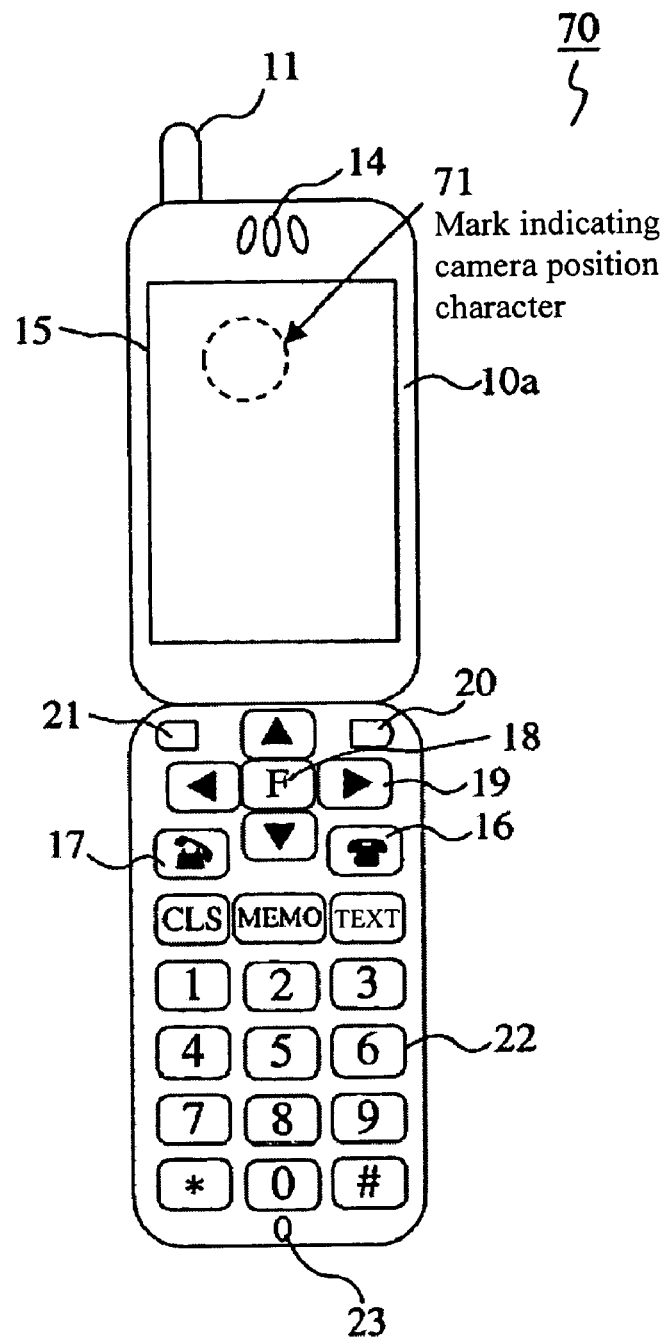
FIG. 10 is a view showing the outer appearance of a portable terminal device according to another embodiment.
Figure 10B:
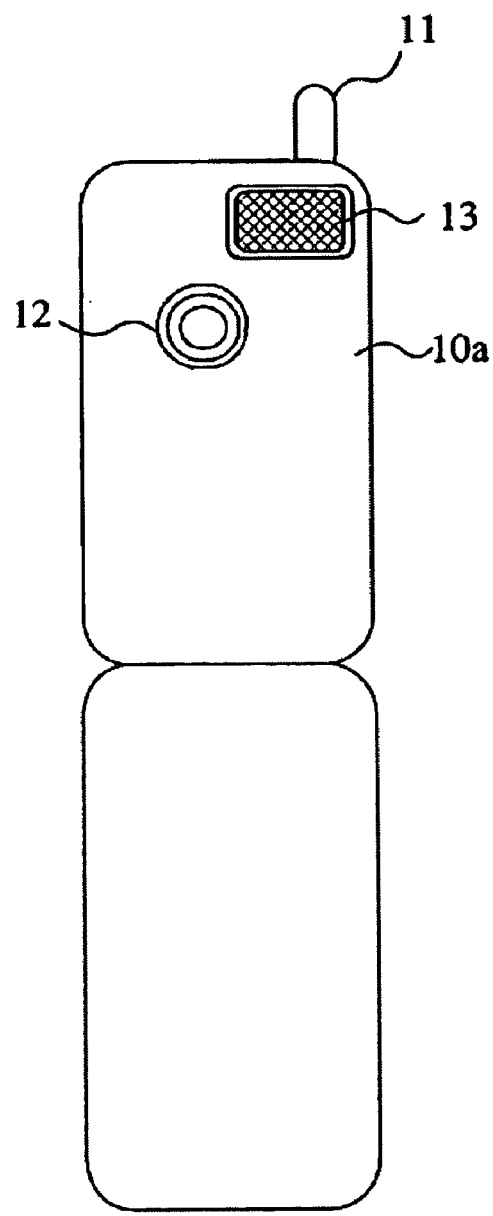

Further, according to the position of the camera 12, the mark may be displayed on the LCD display part 15 (marker display means) as shown in FIG. 10.

In FIG. 10, a portable telephone 70 with a camera (portable terminal device) displays a mark 71 indicating the camera position on the LCD display part 15 on the back surface of the main body 10*a* and just at the back of the camera 12 (opposite position of the opening of the camera 12).

When the mark is displayed on the LCD display part 15, it is preferable to delete the mark when operating the shutter. Further, when the device has this configuration, the mark may not be displayed after the reading starts in the event of reading start operation (S7) in FIG. 4. Further, when the captured image in Step 8 of FIG. 4 is displayed on the LCD display part 15, the mark 71 indicating the position of the camera 12 may be displayed simultaneously.

As described above, since the mark 71 is provided at a position corresponding to the position of the camera 12, the mark is used as a target to bring the camera 12 over a code to be read as an object, thereby resulting in easy operation.

Figure 11:
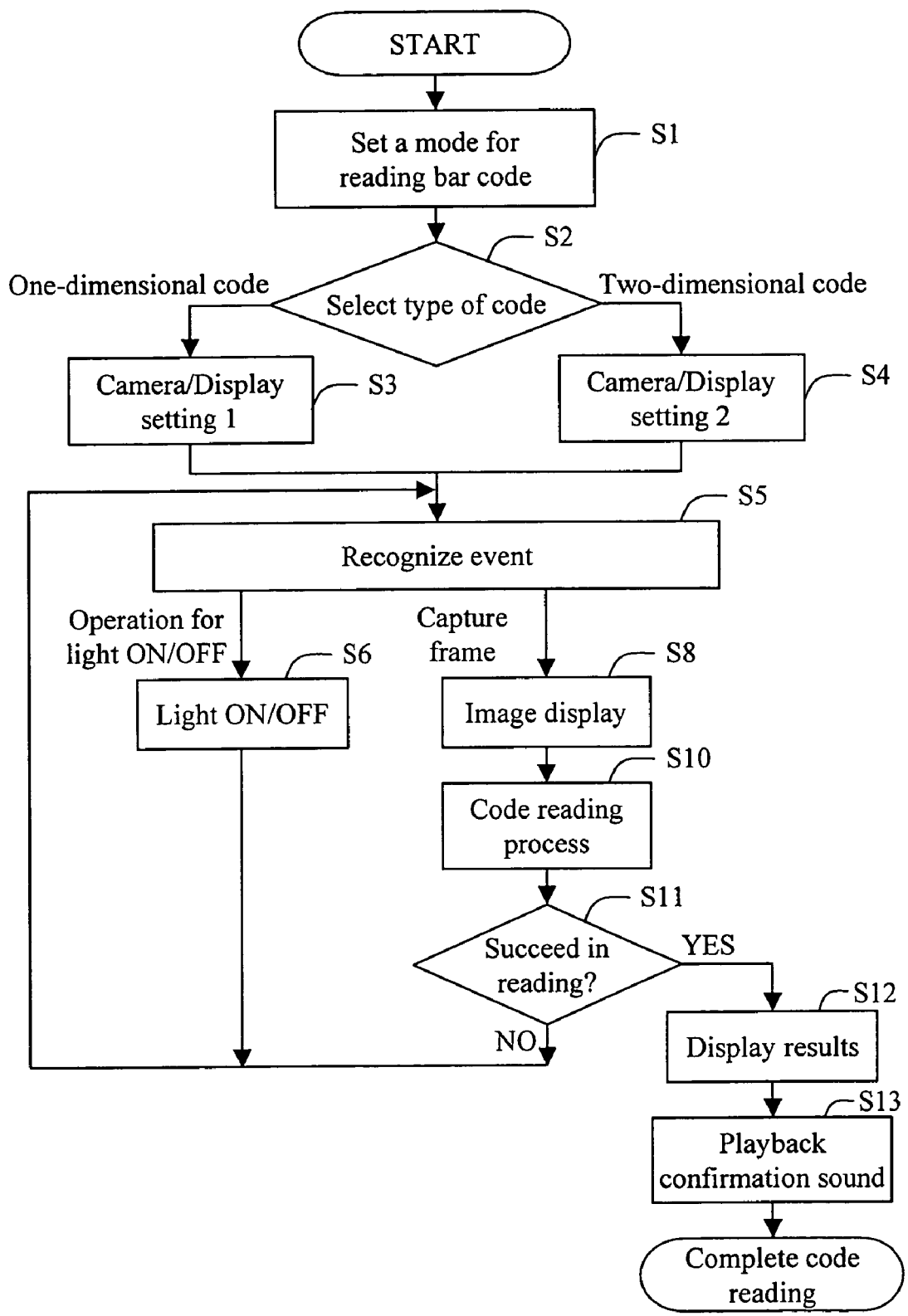
FIG. 11 is a flow chart showing bar code reading operations of the portable terminal device according to another embodiment.

FIG. 11 shows an example as another embodiment of the present invention. FIG. 11 is a flow chart showing bar code reading operations according to another embodiment. In FIGS. 4 and 11, like parts are designated by like reference numbers.

In FIG. 11, steps corresponding to Steps 7 and 9 of FIG. 4 are omitted. In this case, after frame capture event is recognized in Step 5, the image is displayed in Step 8. Then, the routine immediately advances to Step 10, and the code reading process is conducted.

In this embodiment, an image cannot be displayed at a high frame rate before starting the code reading. However, user's operations such as pressing a reading start button (e.g., telephone function key 17), can be omitted, and thus it is advantageous that the number of operations can be decreased.

Further, in another embodiment, an image captured by a camera is stored in a storage memory and the image is displayed. Then, the process is stopped once. During the stoppage, a user may be allowed to determine whether or not to start the code reading process using the displayed image. When the user selects the code reading start, the code reading starts. Otherwise, the stored image is discarded, and a new image is captured by the camera.

This embodiment is effective for a case wherein a portable terminal has a remarkably low processing performance and takes one second or more for the code reading process. A user can judge whether or not to start the code reading process after observing the captured image thoroughly. Therefore, images that obviously cause reading failure (blurred images due to hand shaking, etc.), are not used for the code reading, and the image is captured again. This reduces the number of the code reading processes to be performed to the minimum.

As described above, the portable telephone 10 with a camera according to this embodiment comprises a camera 12 for inputting image information of interest, a small light 13 for emitting light by operating an ON/OFF button 21 when reading a bar code, an LCD display part 15 for displaying the information, and a control part 31 including a CPU, which controls the entire device. The control part 31 switches photography procedures depending on the existence of objects such as natural images or bar codes. When the device is switched to bar code photography, the control part recognizes a bar code and notifies a user of the recognized result, and conducts predetermined processes based on the recognized contents. Therefore, when a bar code is read by a camera of a portable telephone, which has a relatively low resolution, the camera automatically shifts to a bar code reading mode suitable for photographing bar codes, and codes can be read correctly with easy operations.

Further, in switching to bar code photography mode, images obtained by the camera 33 are displayed on the display part 35 at a high frame rate until the code recognition process starts. After the code recognition process starts, images are displayed at a frame rate necessary for the code recognition process. Therefore, the reading operations are preformed continuously on each image captured successively, and smooth moving images can be displayed on the LCD display part 15, so that the code can be positioned appropriately.

The above description illustrates preferred embodiments of the present invention, but the scope of the present invention is not limited thereto.

Incidentally, the above embodiments show examples suitable for a portable telephone. However, the present invention is applicable to portable information terminals such as PDAs, and other information processing devices such as PCs, as long as they have cameras (built-in/externally equipped) provided therewith. Further, a code to be read may be any code.

Further, in the above embodiments, the term "portable terminal device" is used, but this term is used for the description as a matter of convenience. Thus, needless to say, it may be a communication terminal device, an information reading device, or an information reading method.

Furthermore, in the above embodiment, messages displayed by characters or icon on the display part 15, and reading completion sounds through a speaker 14 are described as notifying means. However, any notifying method can be used, such as voices. When voices are used for notification, the portable telephone is provided with a voice output part comprising a voice data generation chip, a D/A converter, an amplifier, and a speaker. Then, voice synthesis containing message content corresponding to reading completed/reading failure is performed using the voice data generation chip, and then the synthesized voice is outputted through the speaker. Further, messages indicating that the user should turn on the light 13, or that it is necessary to change the type of bar code, are displayed on the display part 15. In addition to the displaying, voices or sounds can be used for notification.

Moreover, the type and the number of and connection methods among individual circuit parts, for example, storage parts or display parts, which constitute the above portable terminal device, are not limited to the above embodiments.

Further, the portable terminal device described above can be achieved by a program that causes these portable terminal devices to function. This program is stored in a computer-readable recording medium. In the present invention, this recording medium may be the main memory of the control part 31 as shown in FIG. 2. Alternatively, a device for reading the program such as a CD-ROM drive is provided as an external storage device, and the recording medium may be other medium containing a program, such as a CD-ROM readable by inserting it into the device. In either case, the stored program may be accessed and executed by the CPU of the control part 31. Alternatively, in either case, the program is read out, the read-out program is downloaded in a program storage area (not shown), and then the program is executed. In this case, a program for download is supposed to be stored in each device in advance.

Here, the above medium containing a program is a recording medium constituted to be separable from a portable terminal device or an information processing device, and it may be a medium carrying a program fixedly. Examples thereof include: disks, e.g., magnetic disks including magnetic tapes and cassette tapes, and optical disks including CD-ROMs, CD-R/RWs, MOs, MDs, DVD-ROMs, DVD-RAMs, and DVD-RWs; cards, e.g., PC cards, compact flash cards™, smart media™, IC cards, SD cards™, and memory sticks™; and semiconductor memories, e.g., mask ROMs, EPROMs, EEPROMs, and flash ROMs.

Further, it may be a medium carrying a program flexibly, such as in the case of downloading a program from a communications network through communication connection means connectable to an Internet provider or an external communications network such as a server terminal 400. However, when the program is downloaded from a communications network as described above, a program for download is stored in advance or installed from another recording medium. The content stored in the recording medium is not limited to a program, but may also be data.

As described above, according to the present invention, a portable terminal device such as a portable telephone with a camera enables codes to be read precisely with easy operations.

Further, the present invention can provides a portable terminal device that allows the opening of the camera to be easily positioned on an object thereby to enhance the usability and the operability of code reading.

What is claimed is:

1. A portable terminal device comprising:
    an imaging unit that images an object;
    a display unit that displays an image produced by said imaging unit at a predetermined frame rate;
    a code-reading instructing unit that instructs that code-reading should be started; and
    a code recognizing unit that recognizes a code of the imaged object in response to a code-reading instruction given by said code-reading instructing unit, and
    a frame-rate control unit that renders the frame rate after the issuance of the instruction for starting code-reading into a frame rate necessary for code recognition and renders the frame rate prior to the start of code reading to be higher than the frame rate after the start of code reading.

2. The portable terminal device according to claim 1, further comprising:
    an imaging procedure switching unit that switches the imaging unit between an object mode and a code mode, wherein, after the imaging unit is switched by said imaging procedure switching unit to a code mode and before the issuance of the instruction for starting code reading, image information is displayed on said display unit at a frame rate that is higher than the frame rate following the issuance of the instruction for starting code reading.

3. The portable terminal device according to claim 1, wherein said imaging procedure switching unit changes an image captured area in said imaging unit depending on a characteristic of an imaged code.

4. The portable terminal device according to claim 2 or 3, wherein said imaging procedure switching unit changes the display magnification of image information on said display unit depending on a characteristic of an imaged code.

5. The portable terminal device according to claim 4, wherein said characteristic of an imaged code comprises the number of dimensions of the imaged code.

6. The portable terminal device according to claim 2, wherein said imaging procedure switching unit changes at least one of gradation property, contrast, brightness, white balance, exposure, focus depth, edge enhancement, and resolution when the imaging unit is switched to code mode.

7. The portable terminal device according to claim 1, further comprising a notification unit that notifies the result of recognition by said code recognizing unit.

8. The portable terminal device according to claim 7, wherein said notification unit notifies the result of recognition via sound, voice, or a message displayed on said display unit.

9. The portable terminal device according to claim 1, wherein the result of recognition is displayed on said display unit after code recognition is completed.

10. The portable terminal device according to claim 7, further comprising a timer setting unit that counts a set time,
    wherein said notification unit notifies the failure of recognition upon failure to recognize a code within a time set by said timer setting unit.

11. The portable terminal device according to any one of claims 1 or 2–10, wherein said portable terminal device is a cellular phone or a portable information terminal.

12. The portable terminal device according to claim 1, further comprising an illuminating unit that illuminates an imaged object.

13. The portable terminal device according to claim 12, further comprising illumination switching for turning on/off said illuminating unit.

14. A computer-readable recording medium recorded with a program for causing a computer to execute the following steps:
    imaging step for imaging an object;
    imaging procedure switching step for switching between an object imaging procedure and a code imaging procedure;
    displaying step for displaying an image obtained by said imaging step;
    code recognizing step for recognizing a code of an imaged object during the code imaging procedure and
    a frame rate control step that sets the frame rate prior to the start of code reading to be higher than the frame rate after the start of code reading.

* * * * *